US007272637B1

(12) United States Patent
Himmelstein

(10) Patent No.: US 7,272,637 B1
(45) Date of Patent: Sep. 18, 2007

(54) COMMUNICATION SYSTEM AND METHOD FOR EFFICIENTLY ACCESSING INTERNET RESOURCES

(76) Inventor: Richard B. Himmelstein, 7 Braden Dr., Palermo, NJ (US) 08223

( * ) Notice: Subject to any disclaimer, the term of this patent is extended or adjusted under 35 U.S.C. 154(b) by 493 days.

(21) Appl. No.: 09/585,151

(22) Filed: Jun. 1, 2000

(51) Int. Cl.
*G06F 15/16* (2006.01)
*G06F 7/00* (2006.01)
*G06F 17/30* (2006.01)
*G06F 3/00* (2006.01)
*G06F 9/00* (2006.01)

(52) U.S. Cl. ......................... 709/217; 707/10; 715/765; 715/780

(58) Field of Classification Search ................ 709/203, 709/217; 345/738, 739, 744, 746, 788, 853, 345/764–765, 780, 809, 821, 835, 859–860; 707/1, 102, 10, 3; 715/503–504
See application file for complete search history.

(56) References Cited

U.S. PATENT DOCUMENTS

| | | | | |
|---|---|---|---|---|
| 4,560,983 A | * | 12/1985 | Williams | 340/825 |
| 5,202,828 A | * | 4/1993 | Vertelney et al. | 715/530 |
| 5,341,293 A | * | 8/1994 | Vertelney et al. | 715/530 |
| 5,418,950 A | * | 5/1995 | Li et al. | 707/4 |
| 5,572,726 A | * | 11/1996 | Hasuo | 707/200 |
| 5,590,178 A | | 12/1996 | Murakami et al. | |
| 5,619,688 A | * | 4/1997 | Bosworth et al. | 707/4 |
| 5,649,194 A | | 7/1997 | Miller et al. | |
| 5,675,507 A | * | 10/1997 | Bobo, II | 709/206 |
| 5,675,787 A | | 10/1997 | Miller et al. | |
| 5,689,700 A | | 11/1997 | Miller et al. | |
| 5,752,025 A | * | 5/1998 | Shakib et al. | 707/102 |
| 5,752,253 A | * | 5/1998 | Geymond et al. | 715/503 |
| 5,778,367 A | * | 7/1998 | Wesinger et al. | 707/10 |
| 5,787,440 A | * | 7/1998 | Bakke et al. | 707/103 R |
| 5,793,966 A | * | 8/1998 | Amstein et al. | 709/203 |

(Continued)

FOREIGN PATENT DOCUMENTS

WO 9856159 10/1998

OTHER PUBLICATIONS

The home page for "Dogpile.com", captured Jan. 16, 1999, retrieved from <web.archive.org/web/19990116222229/http://www.dogpile.com/>.*

(Continued)

*Primary Examiner*—David Wiley
*Assistant Examiner*—George C. Neurauter, Jr.
(74) *Attorney, Agent, or Firm*—Benesch Friedlander LLP; Robert R. Lech

(57) ABSTRACT

A data table that is customizable by a user prior to accessing the internet or after accessing the internet. The user may use a simple keyword, such as a telephone number or facsimile number, to begin the search of a database or multiple databases. Once the keyword has retrieved the proper information, the system populates the table. This permits the user to easily access the internet and retrieve e-mail addresses or other relevant information by providing a phone number, facsimile number or other information relating to the particular entity. Using the data table, the system displays all information related to the keyword input as unique individual identifiers such as e-mail, phone, facsimile number or website address. Selecting one of the unique individual identifiers prompts the system to automatically invoke further action, such as dialing a phone number.

48 Claims, 13 Drawing Sheets

U.S. PATENT DOCUMENTS

| | | | |
|---|---|---|---|
| 5,802,518 A | | 9/1998 | Karaev et al. |
| 5,809,415 A | * | 9/1998 | Rossmann .................. 455/422 |
| 5,812,776 A | | 9/1998 | Gifford |
| 5,826,034 A | * | 10/1998 | Albal .......................... 709/239 |
| 5,826,039 A | * | 10/1998 | Jones .......................... 709/206 |
| 5,835,089 A | * | 11/1998 | Skarbo et al. .............. 345/751 |
| 5,850,433 A | | 12/1998 | Rondeau |
| 5,877,746 A | * | 3/1999 | Parks et al. ................. 345/156 |
| 5,918,225 A | * | 6/1999 | White et al. .................... 707/3 |
| 5,923,736 A | * | 7/1999 | Shachar ................... 379/93.17 |
| 5,930,474 A | * | 7/1999 | Dunworth et al. .......... 709/217 |
| 5,950,193 A | * | 9/1999 | Kulkarni ........................ 707/3 |
| 5,974,416 A | * | 10/1999 | Anand et al. ................. 707/10 |
| 6,016,488 A | * | 1/2000 | Bosworth et al. .............. 707/4 |
| 6,094,649 A | * | 7/2000 | Bowen et al. .................. 707/3 |
| 6,131,096 A | * | 10/2000 | Ng et al. ...................... 707/10 |
| 6,147,773 A | * | 11/2000 | Taylor et al. ............... 358/400 |
| 6,259,449 B1 | * | 7/2001 | Saxena et al. .............. 345/853 |
| 6,374,259 B1 | * | 4/2002 | Celik ...................... 707/104.1 |
| 6,457,066 B1 | * | 9/2002 | Mein et al. ................. 719/330 |
| 6,526,399 B1 | * | 2/2003 | Coulson et al. ................ 707/1 |
| 6,701,485 B1 | * | 3/2004 | Igra et al. ................... 715/503 |

OTHER PUBLICATIONS

The World Wide Web Consortium. "HTML 4.0 Specification", chapters 2, 11, 17 and 18, Apr. 24, 1998, 75 pages.*

IBM Corporation. "HyperActions in a Markup Language". IBM Technical Disclousre Bulletin, vol. 30, Issue 1, Jan. 1, 1996, 1 page.*

The Apache Software Foundation. "Module mod_log_common", publicly posted Oct. 28, 1996, <http://web.archive.org/web/19961028122916/www.apache.org/dosc/mod_log_common.html>.*

Dar, Shaul et al. "DTL's DataSpot: Database Exploration Using Plain Language", Proceedings of the 24th VLDB Conference, New York, USA, 1998, pp. 645-648.*

Howe, Denis, "Distributed Database", publicly posted Dec. 7, 1994, 1 page.*

W3Schools.com. "SQL The SELECT Statement", retreived from <www.w3schools.com/sql/sq_select.asp>, 3 pages.*

* cited by examiner

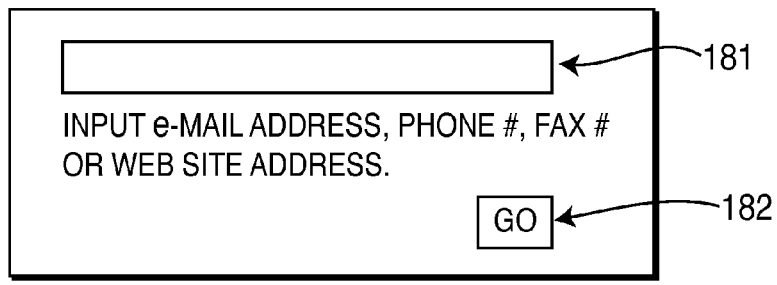
FIG. 3A
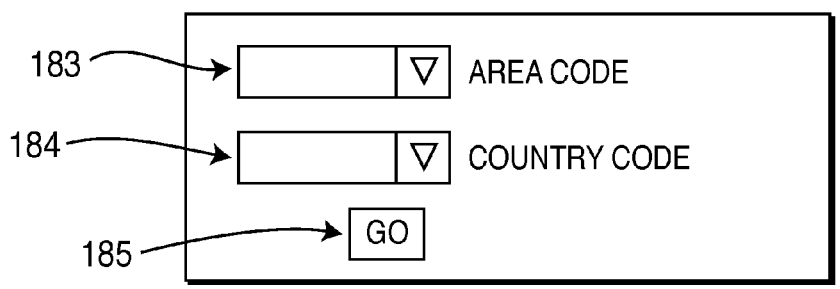
FIG. 3B
FIG. 3C

```
196 ——•  NAME              JOHN SMITH
         •  e-MAIL ADDRESS    JSMITH@AOL.COM
197 ——•  MOBILE PHONE #    888-242-2125
         •  PHONE # (HOME)    601-212-1125
198 ——•  PHONE # (WORK)    601-433-7126
199 ——•  FAX #             601-717-1111
                             222 PARK AVE
                             GREENTOWN, NJ 07112
```

FIG. 3D

|  | XYZ COMPANY EMPLOYEE | |
|---|---|---|
| NAME | HOME ADDRESS | e-MAIL |
| TOM ABBET | N/A | TABBET@XYZ.COM (CEO) |
| DEBBIE CASTER | N/A | DEBBIEC@AOL.COM (CUSTOMER SERVICE) |
| DAN TAYLOR | N/A | DTAYLOR@VERIZON.NET (MARKETING MANAGER) |

FIG. 3E

```
   BEST BUY           121 MARKET ST. PHILADELPHIA
 • PHONE #
 • FAX #

BEST BUY           247 CHESTNUT ST. PHILADELPHIA
 • PHONE #
 • FAX #

BEST BUY           14 FONT ST. PHILADELPHIA
```

FIG. 3F

500 — KEY PHRASE: MARY ADAMS CISCO CUSTOMER SERVICE

510 — TABLE HEADINGS ▽

ACCOUNT NUMBER
BALANCE
BUSINESS ADDRESS
BUSINESS FACSIMILE NUMBER
▷ BUSINESS PHONE NUMBER
CELLULAR PHONE NUMBER
e-MAIL ADDRESS
▷ EXTENSION
HOME ADDRESS
HOME FACSIMILE NUMBER
HOME PAGE
HOME PHONE NUMBER
▷ NAME
PAGER NUMBER
STOCK SYMBOL
▷ TITLE
VACATION HOME ADDRESS
VACATION HOME FACSIMILE NUMBER
VACATION HOME PHONE NUMBER
CREATE CUSTOMIZED HEADING

502 →

| NAME | TITLE | BUSINESS PHONE NUMBER | EXTENSION |
|---|---|---|---|
|  |  |  |  |
|  |  |  |  |
|  |  |  |  |

COMMUNICATION SYSTEM AND METHOD FOR EFFICIENTLY ACCESSING INTERNET RESOURCES

BACKGROUND

The present invention is a system for permitting internet users to access network resources more efficiently. Particularly, the present invention is a system which uses unique individual identifiers, such as a phone number or facsimile number, as the primary search keyword to access internet resources and selectively access additional internet resources as desired by the individual. Using the system, an individual may also perform various functions such as placing a telephone call, or sending a fax or e-mail with a single selection (i.e., "one click"). This permits individuals to browse or otherwise "surf the net" faster.

The internet is a global computer network that connects all different types of operating systems and networks. It not only provides the physical backbone connections among networks, but also establishes the standard formats that enable different networks to communicate and share information. For example, the simple mail transfer protocol (SMTP) is the internet e-mail standard that specifies the format of a message, so that a user on one computer network may successfully transfer mail to a user on another network. Without the SMTP, different networks which create their own e-mail message formats could only be understood if the e-mail receiver used the same type of network as the sender, or the receiving network had a plurality of different e-mail format converters to interpret different formats of incoming e-mail messages.

Each network e-mail application which uses the internet converts mail originating on the network from the format that the network uses into SMTP format before transmission over the internet, and each receiving e-mail application converts the SMTP formatted e-mail into its format. Therefore, instead of having many different types of e-mail message converters for each different e-mail format, different network e-mail applications can communicate using a single SMTP format converter. The same principle also be can applied to transferring data files among different networks.

Electronic mail is the most widely used application on the internet. Each receiver has to have an unique internet e-mail address for proper e-mail delivery. An internet user typically establishes an e-mail address by subscribing to an internet service from an internet service provider (ISP) who provides the host and gateway functions to the internet for the user. An ISP can be a university, a government entity, a private corporation or a commercial service provider. The provider will assign each user a unique e-mail address. No two users should have the same e-mail address unless they desire to be treated as a single entity by the internet.

The characteristics of e-mail address syntax and structure are well defined. An e-mail address consists of a unique combination of several terms. For example, when John Smith signs up with America Online® (AOL) as his internet service provider, John Smith will select a first portion of his e-mail address and will be assigned a second portion of his e-mail address. If John Smith's e-mail address is JSMITH@aol.com; "aol" is the abbreviation of America Online; "com" indicates that America Online is a commercial website; and JSMITH is the local part of the e-mail address. E-mail that is sent to JSMITH@aol.com will first be forwarded to the host AOL domain, aol.com, and then AOL will further deliver the e-mail to the mailbox JSMITH.

Although the domain part plus the local part of an e-mail address such as JSMITH@aol.com is a much easier format to memorize than the actual 32 bit internet mailbox address (as dotted decimal notation, for example, 247.012.123.114), several difficulties still exist.

First, there is no consistent rule for naming a local part of a user's mailbox. In the AOL example, the local part is made of the first character of John's first name in combination with his last name, i.e., JSMITH. Once JSMITH is assigned to John on the aol.com domain, other John Smiths, a Joan Smith or a Joe Smith on the aol.com domain must choose a user name other than JSMITH to distinguish between themselves. Moreover, thousands of other ISPs use different ways to name their users' local part. It is almost impossible to guess the local part of a user even if his or her name is known. Non-alphanumeric characters, such as @, ^ or % could be used in the e-mail address. Foreign ISPs and foreign e-mail addresses can also have non-English characters. Accordingly, it is difficult for an internet user to memorize a plurality of different e-mail addresses.

In contrast, due to their ubiquitous use and uniformity, phone numbers and facsimile numbers consist of a universally accepted digital number scheme which makes the numbers easier to remember. Additionally, phone numbers and their owners are readily available through many information sources including phone books, phone number CDs or even internet sites that provide such information.

There are several prior art systems which attempt to help an internet user access the address of other internet users more easily. For example, U.S. Pat. No. 5,826,039 to Jones discloses a universal networking directory service. A sender provides information regarding a particular receiver, such as the person's name, city and the state of residency, and the system retrieves the receiver's proper internet address. The sender can then use this address to contact the receiver.

U.S. Pat. No. 5,850,433 to Rondeau discloses an online electronic directory service. The service includes a dedicated server and a database similar to the paper yellow pages, which permit a user calling the database to be connected directly to the selected entity. A user can retrieve information from the database by entering different search parameters. Once the user reviews the results of the particular query and selects an entity, the server automatically places a telephone call to the selected entity.

U.S. Pat. No. 5,778,367 to Wesinger, Jr., et al discloses a directory service which lets each individual user forward information to be electronically published. The information is automatically classified and then stored in a database. Other users might then search the database by specifying different parameters including name, title, phone number, facsimile number and e-mail address. The users fill in information regarding their fields of interest and the directory service returns entries having matching information for those fields.

U.S. Pat. No. 5,590,178 to Murakane discloses a service which links an e-mail system with a telephone system. The system retrieves all e-mail corresponding to a particular phone number to be automatically displayed when a telephone call to the particular phone number is placed or received.

U.S. Pat. No. 5,812,776 to Gifford discloses a method for a user to access web pages by either using a telephone number or descriptive term relating to the searching company or product. However, this system only retrieves the web page without further processing or analysis.

Although many of these prior art systems permit a user to access websites based upon selected information, these systems do not permit users to capture selected portions of those websites for further processing.

SUMMARY

The present invention includes a data table that can be customizable by a user prior to accessing the internet or after accessing the internet. The user may use a simple keyword, such as a telephone number or facsimile number, to begin the search of a database or multiple databases. Once the keyword has retrieved the proper information, the system populates the table. This permits the user to easily access the internet and retrieve e-mail addresses or other relevant information by providing a phone number, facsimile number or other information relating to the particular entity.

Using the data table, the system displays all information related to the keyword input as unique individual identifiers such as e-mail, phone, facsimile number or website address. Selecting one of the unique individual identifiers prompts the system to automatically invoke further action, such as dialing a phone number.

Accordingly, it is an objective of the present invention to use a keyword, such as phone number or facsimile number, as the primary search keyword to retrieve information from the internet and store the information in a format desired by the user.

BRIEF DESCRIPTION OF THE DRAWINGS

FIGS. 3A–3F are diagrams illustrating internet database access through phone number or facsimile number search.

FIGS. 5A–5F are detailed screen displays of the system including a data table for selectively retrieving and displaying data in accordance with the present invention.

DETAILED DESCRIPTION OF THE PREFERRED EMBODIMENTS

Figure 1:
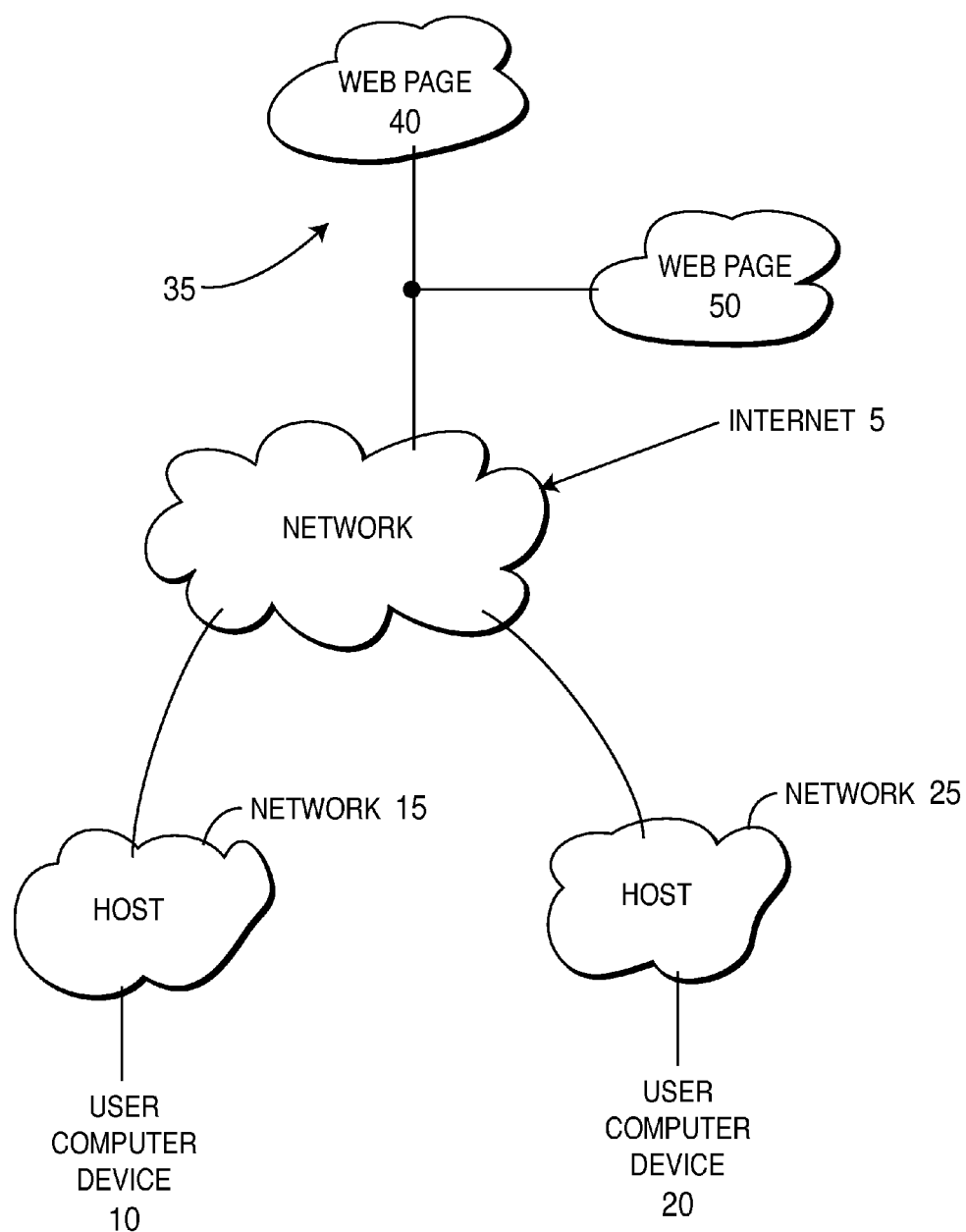
FIG. 1 is an overview of the internet.

The present invention will be described with reference to the drawing figures where like numerals represent like elements throughout.

Referring to FIG. 1, a plurality of networks 15, 25, 35 and web pages 40 and 50 are shown connected to the internet 5. A first user 10 is a resident on a first network 15 and a second user 20 is a resident on a second network 25. Even if the two networks 15, 25 are different types of networks, (for example if network 15 is an Ethernet-based Novell network and network 25 is a token ring-based Microsoft Windows NT network), by utilizing the internet 5, the users 10, 20 may communicate via e-mail and perform file transfers. This is achieved by each network 15, 25, 35 converting outgoing data into a standard format such as SMTP, and converting incoming data from the standard format into the format for the particular network 15, 25, 35. By specifying a particular e-mail address or a designated web address, an internet user 10, 20 may compose and transmit an e-mail and the internet 5 will automatically route the e-mail to the particular user, or automatically route the desired content of the web page 40, 50 to the requesting user.

The present invention is a system which can run as a module or as part of an application utilized by an internet service provider (ISP), may interface with various kinds of software applications or may run as a "stand alone" package. It may be accessed using various interfacing devices such as a keyboard and mouse. For example, in one embodiment, selecting an icon displayed on a monitor screen activates the present invention.

Figure 2A:
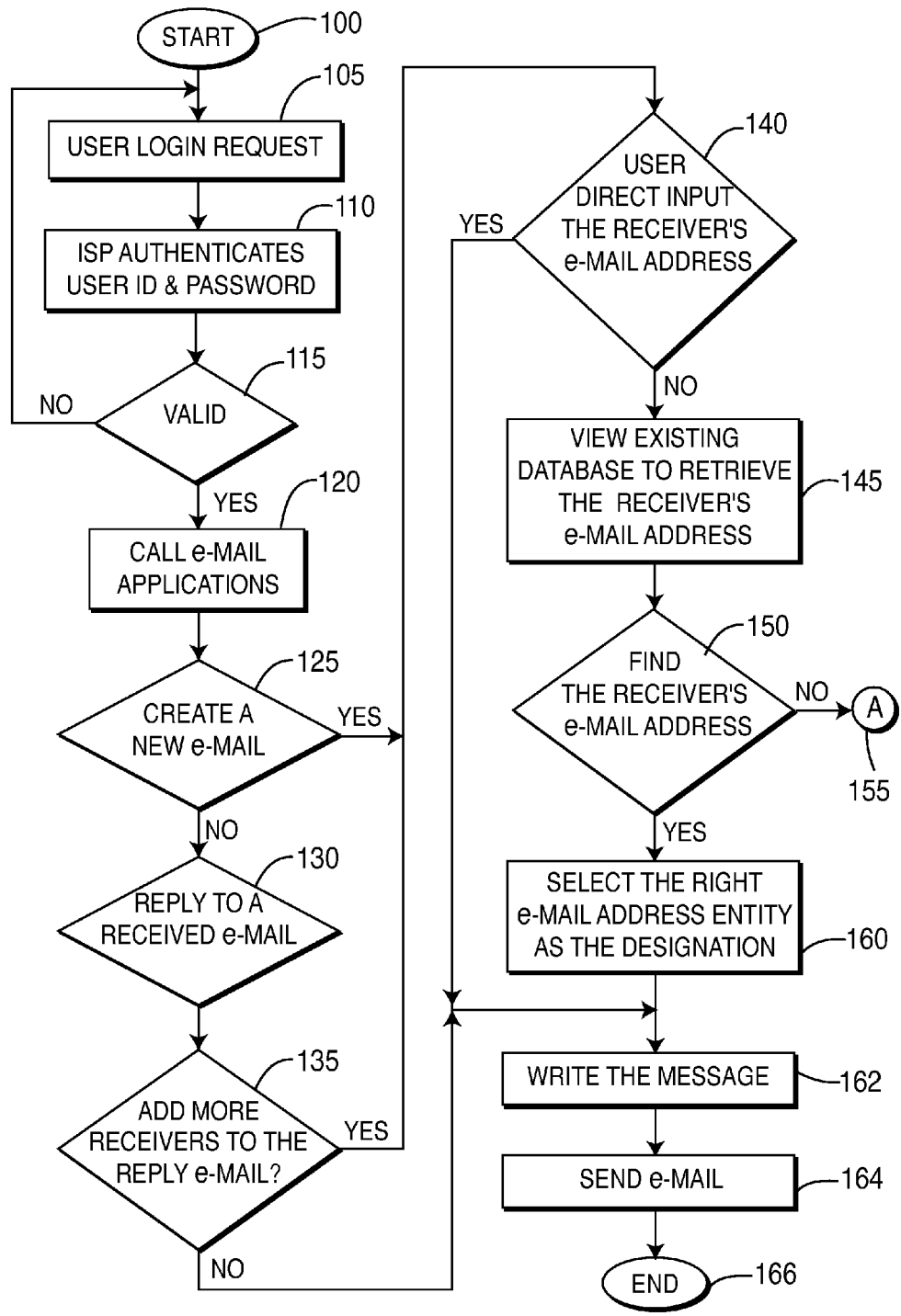
FIG. 2A is a flow diagram illustrating a regular e-mail sending procedure.

Referring to the flow diagram of FIG. 2A, utilizing a typical e-mail application, a sender logs onto the internet (step 105) by issuing an internet login request with his/her computer device to the ISP. The ISP verifies the validity of the user ID and password (step 110). If either the user ID or the password are incorrect (step 115), no access to the internet will be granted by the ISP. If the user ID and password are correct, the ISP connects the user to the internet 5. When the sender is ready to send an e-mail, the sender invokes the e-mail application (step 120) and creates a new e-mail (step 125) or replies to a received e-mail (step 130). The sender can directly enter the receiver's e-mail address if it is known (step 140). Otherwise, the sender can open and view an existing e-mail database (step 145), such as an address book, to determine if it contains the receiver's e-mail address. If the receiver's e-mail address is found (step 150), the sender selects the e-mail address (step 160), writes the message (step 162), and sends the e-mail (step 164). This process then terminates (step 166).

Figure 2B:
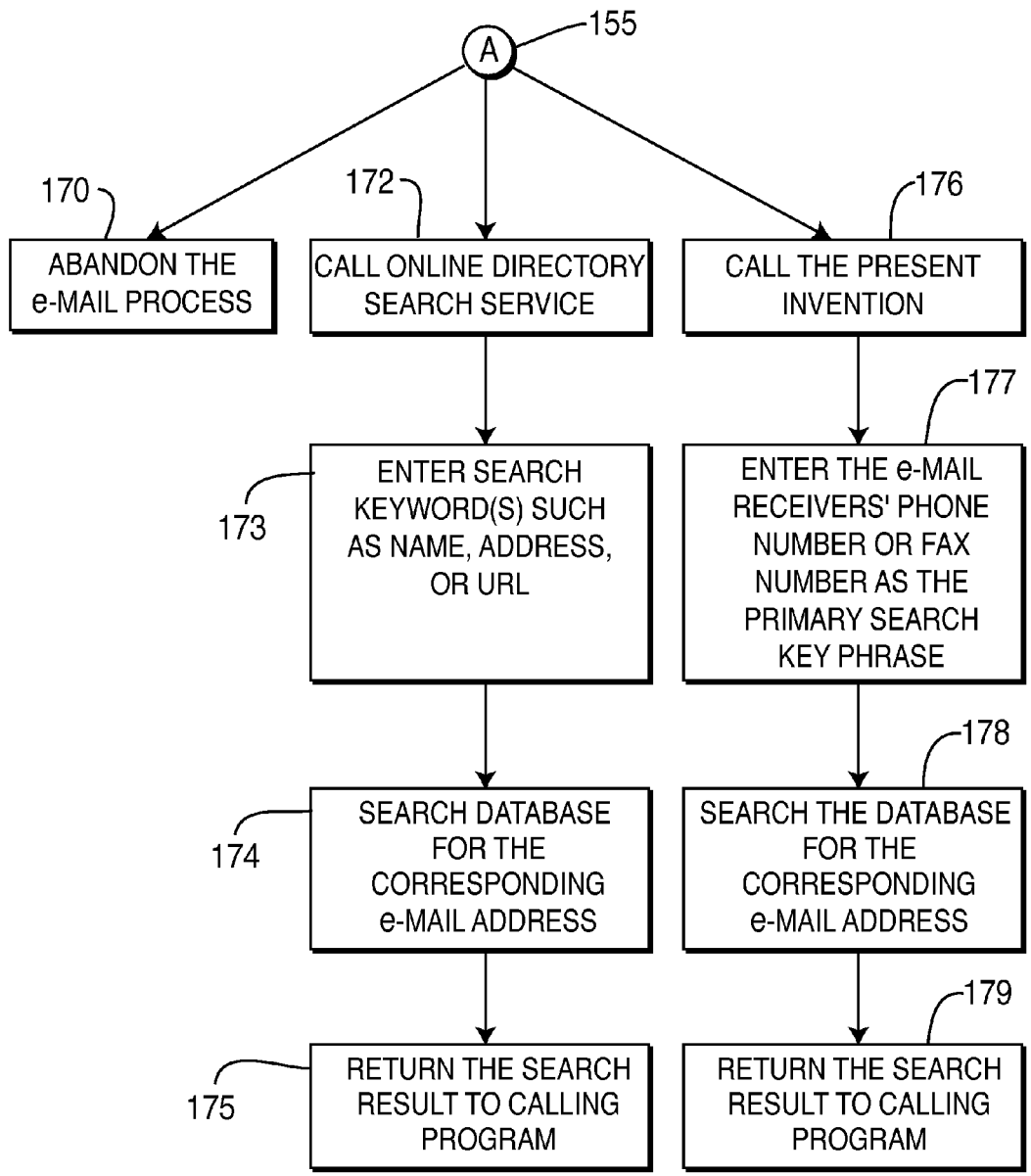
FIG. 2B is a diagram illustrating the different ways to retrieve e-mail address by the prior art and the present invention.

If the sender does not know, and cannot find the receiver's e-mail address from the database of e-mail addresses, then the sender has three alternatives (step 155). As shown in FIG. 2B, in the first alternative the e-mail process is abandoned (step 170). In the second alternative the sender may access an online directory service (step 172) and retrieve the corresponding e-mail address by specifying various keywords (step 173) and searching a database (step 174). The keywords can be the receiver's name, address, URL or other unique identifying information. This alternative can be invoked from a calling program whereby the online directory service will return the proper e-mail address to the sender (step 175). The third alternative activates the present invention (step 176), whereby the user inputs the receiver's phone number or facsimile number as the keyphrase (step 177) to search the database for the receiver's e-mail address (step 178). The system then returns the search results to the user (step 179) to populate the data table. This procedure will be described in greater detail hereinafter.

Referring to FIG. 3A, the system of the present invention has "intelligent" features which makes the search for an e-mail address or other unique individual identifiers transparent to the user. For example, instead of using separate input fields for e-mail addresses, phone numbers, facsimile numbers or website addresses, the screen display has only a single input field 181. A user can type in an e-mail address, website address, phone number or facsimile number into the input field, then select the GO button 182. If the search results in more than one match based on more than one unique keyword selected, the system may prompt the user to narrow down or select one of the matches. For example, if the user selects a keyword such as 1-800-CALL-NOW, the system may return with two different results: 1) a phone number; and 2) a website. The user is prompted to choose whether the key phrase is a website or a phone number. The system could then refine the search based on the additional information. Alternatively, the system may display all selections for the user to choose.

Referring to FIG. 3B, the user can further input an area code 183 or a country code 184 for a particular phone or facsimile number as an option and select the GO button 185 to invoke the application.

The present invention will search all relevant databases and retrieve relevant information that matches the specified key phrase. For example, a user inputs John Smith's phone number, 601-212-1125 (the dashes "-" can be created automatically by the system), in the input field 181 then selects the GO button 182 and the system searches for the phone number.

Referring to FIG. 3C, the system retrieves relevant information from one or multiple databases and displays all information that exists for the individual in the customized table 187 including John's name, John Smith's e-mail address, phone number, facsimile number, and website address 188–195. The system retrieves this information based on the headings of the retrieve and display table. Because John Smith doesn't have a website address, the table indicates that the website not available 195. In one embodiment, a user can create different display tables or modify existing ones. Alternatively, the invention may display the information without a table.

A simplified retrieve and display table is shown in Table 1. This retrieve and display table includes fields such as name, e-mail address, mobile phone number, home phone number, work phone number, facsimile number and home address.

TABLE 1

Name
E-Mail
Mobile Phone Number
Phone Number (Home)
Phone Number (Work)
Fax Number
Home Address If a user selected Table 1 as the retrieve and display table and inputs John's phone number or facsimile number as the search keyword, the system searches through relevant databases and retrieves John's name, e-mail address, mobile phone number, home phone number, work phone number, facsimile number, and home address and displays them as shown in FIG. 3D. If a displayed item can lead to further action, the system indicates such. One manner is having a circular area displayed in front of the item which a user can select to invoke the further action. For example, referring to FIG. 3D, John's e-mail address, mobile phone number, home phone number, work phone number and facsimile number all have the circular area 196, 197, 198, and 199 which precedes each item. A user can decide whether he wants to send John an e-mail, call John at his home, work or mobile phone or send a facsimile (by downloading the file to be faxed), by selecting the corresponding circular area. Alternatively, red or blue contrasting lettering may be used to indicate further action is available by clicking on the same.

The system interfaces with software modules that do the activity such as e-mail, call by phone or send a facsimile, or may incorporate its own module to do such. If a user and an individual being called both have equipment that permits video web phone applications, the system may automatically invoke the application in such a manner. The system permits an individual to use their e-mail address as their phone number or fax number, thereby permitting individuals to call or fax other individuals over the internet. The system can use an e-mail address as the keyword to then allow someone to choose options such as "phone", "facsimile", etc. The system can also use an individual's e-mail address to provide their corresponding physical address, such as their home address. The present invention retrieves information from relevant databases, either from the internet or a local computer, and displays results according to the retrieve and display table. The system can be expanded to include other unique identifiers such as pager numbers, cell phone numbers, vacation home phone numbers. If an item includes more than one selection, for example, if there are multiple vacation phone numbers for the particular user, the system can list all possible selections and provide a pull down menu for further selections.

The present invention is flexible in permitting a user to invoke the system even if the user is using another application, for example, a user is in the middle of composing an e-mail. The same user can invoke the system to make a phone call or send a facsimile to the same or other designations.

Referring back to FIG. 3C, another embodiment of the system, will invoke other applications either to direct dial the selected phone number for the user, dial and send a facsimile to the selected facsimile number, access the website or invoke an e-mail application. In the case where dialing a phone number or facsimile number is selected, if the phone number or facsimile number is shared by one organization, the organization directory can be further retrieved if the user has permission to access. This will be explained in greater detail below.

Referring to FIG. 3E, for example, a user inputs company XYZ's main phone number or facsimile number as the search keyword (i.e., unique individual identifier) and the system displays a retrieved list of individuals at the organization, with their individual e-mail addresses, their title, or specific information. Each name or department may be listed and followed by a field that provides basic information such as one's title, location, department, etc. This information field may be maintained and size altered to accommodate a person's or company's needs. For example, one person's title may be "customer service". The user can select the desired method of contact, such as selecting an e-mail address from the member list of the organization. Of course, the retrieved and displayed information is based on the user request and the restrictions a data base owner/company puts on its database. If an individual or organization desires to be "unpublished", the system can allow such.

For example, a user searches for the main phone number of XYZ company inquiring for a home address and e-mail address. Even though XYZ company has all of its employees' home addresses, XYZ company only allows certain designated employees' names and their e-mail addresses to be accessed, not their home address unless a person requesting the information has "priority access". Therefore, the user can see the display of employee names and e-mail addresses, while employees' home addresses are not available as shown in FIG. 3E. Individuals or companies setting up their database may determine different priority access levels for family, friends, or employees. The system allows this to be set up on an individual basis, family basis, or employee basis and can require for security reasons that a user accessing the database information to submit his e-mail address or password for access. If XYZ is a franchise or chain store, the retrieved information can include information about other local, regional, or national stores such as location, phone numbers, or website address as shown in FIG. 3F. For example, if the user inputs one of the phone numbers of BEST BUY electronics stores in the Philadelphia area, the system will retrieve the address, phone number, and facsimile number of the particular BEST BUY store and display them. The system will parse the user's input to decide whether the input is an e-mail, phone number, facsimile number, or website address. If the user only entered a seven digit number, phone number, or facsimile number and then selected the phone or facsimile buttons, the system automatically prompts for the area code. A user can use the area code or country code option to specify the area where the search shall cover. The system may allow all area codes to be selected by inputting a wildcard "*" in the area code field.

In an alternative embodiment, cell phones, home phones, vacation phones, separate work phones for husbands and wives, pagers and all e-mail addresses (i.e., work or home) may all be included in the table as well. Any of these items, or future "communication" devices, could be sorted under one of five or more designated headings as follows: 1) name; 2) e-mail address; 3) website address; 4) phone number; and 5) facsimile number. For example, if government, medical or banking institutions chose to use an individual's social security number as the major search key phrase, the system would interface with their database and, using the search key phrase, retrieve the requested information. For example, banks have various financial information sorted by credit cards, mortgages, bank accounts etc. Medical information can be sorted by entire medial history, doctor, types of injuries, or diseases/sicknesses from existing internet databases organized with other key phrases.

The present invention permits a user to "surf the net" faster by providing an improved way of accessing the internet for general uses. If a user knows one particular item of information about a company, they can retrieve the company's phone number, facsimile number, e-mail address, and website address upon entering the particular information or description (i.e., unique individual identifier). If any information is not available for access or does not exist there, the system responds with either an "information is unavailable" message or an "information may not exist" message to the user.

If multiple "main" phone numbers, facsimile numbers, e-mail addresses, or web addresses are retrieved, the system will first display the phone number, then the facsimile number, e-mail address, and website address sorted in alphabetical order. The system will display 800 numbers and ".com" website addresses first if they exist, and advise a user to select an option (down arrow) for more. If a user selects to send e-mail, a pull down menu can provide the user with an alphabetical sort of all individuals names with their home or work e-mail addresses along with a brief description such as name, title, and location (if there are multiple business locations).

Figure 4A:
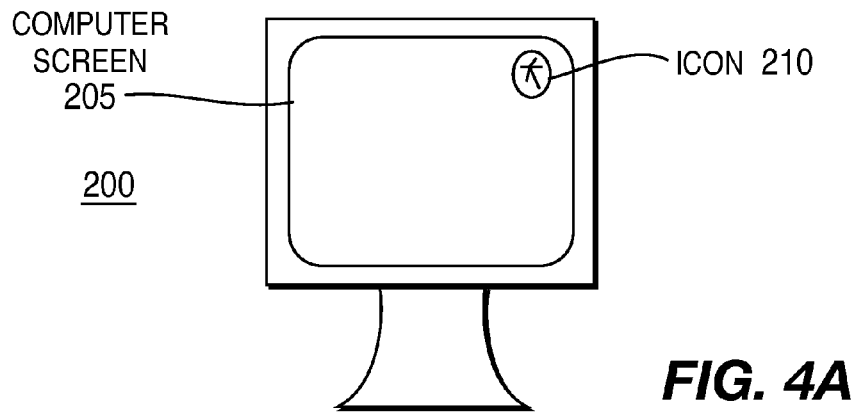
FIGS. 4A–4G are detailed screen displays of a user interface to the present invention.
Figure 4B:
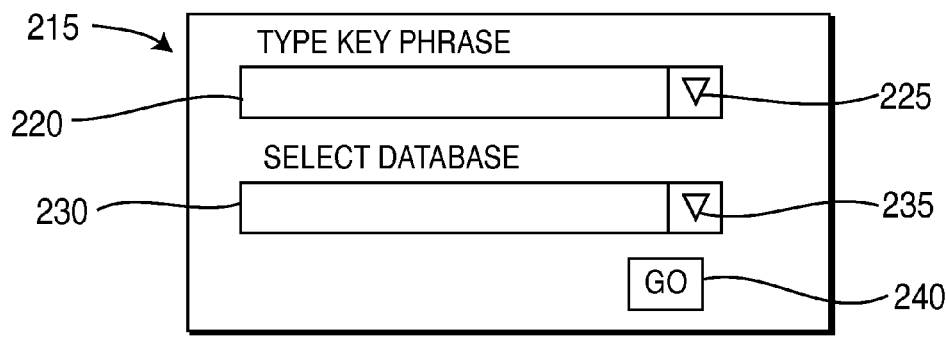
Figure 4C:
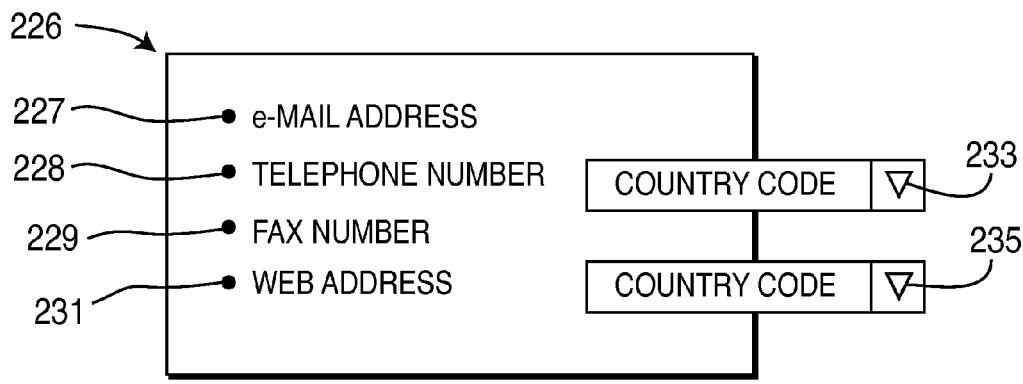
Figure 4D:
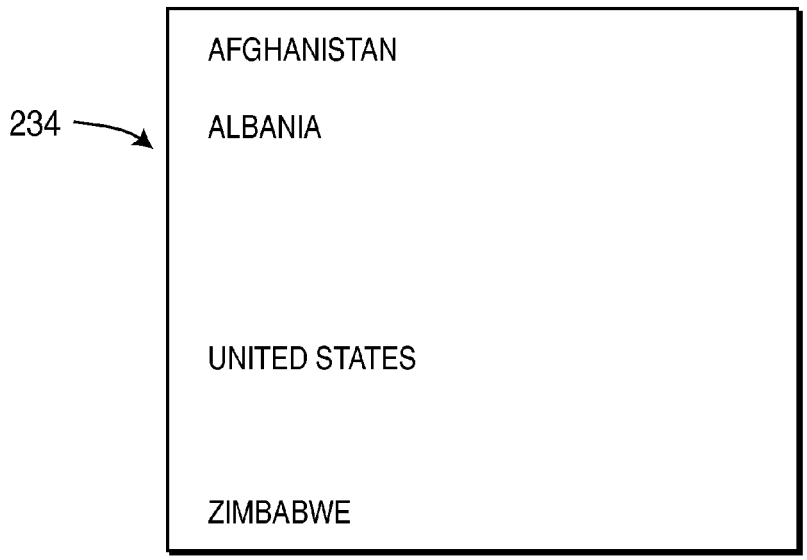
Figure 4E:
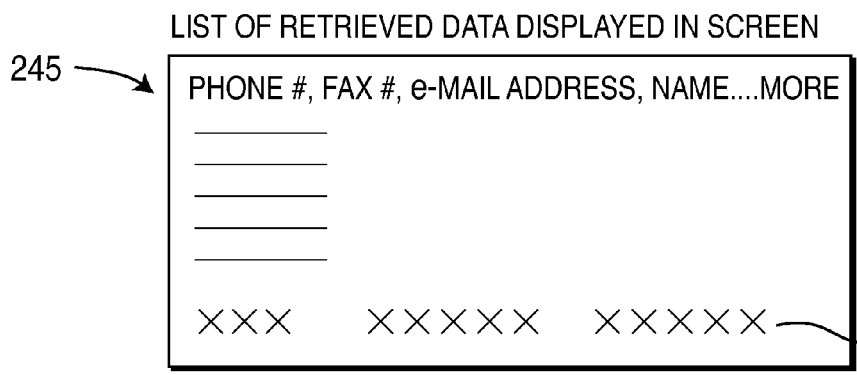

An alternative embodiment 200 of the invention having a graphical user interface (GUI) is shown in FIG. 4A. An icon 210 displayed on a monitor screen 205 represents the present invention and is used to invoke the system. Assuming that the database of the present invention and/or the local database have been established, by directing a pointer to the icon 210 and selecting the icon, the system is invoked. A first embodiment of the invention using the GUI is shown as a screen 215 in FIG. 4B. The database 230 can be selected by directly entering the name of the database, or selecting from an ISP database or a local database. By pointing and clicking on the option pull down menu area 235, the list of databases 236 will be displayed as shown in FIG. 4G. The user can select the database from which he or she will retrieve information. Once the user completes the selection of both the key phrase 220 and the database 230, the user can select the GO icon 240. The results of the search based on the specified web address, e-mail address, phone number, or facsimile number will be displayed as shown in screen 245 in FIG. 4E. The user can view the display and select the correct entity. Alternatively, the system may, transparent to the user, merge all databases into one so that the user does not have to choose a particular database.

For example, if one database is created for a geographical area such as Philadelphia or New York, the system may merge the data and store a single database that is searchable and retrievable. Optionally, the system may search all databases without being required to copy or reclassify the information. Other valuable classifications may also be made, such as a database for attorneys, a database for accountants, a database for retail companies, a database for technical companies and all other types of industries.

The system may provide the first level of information from its own database or subdatabase, a local database and, if additional information is requested, link to a company's database at the second level. The system may obtain the first level of information by using web-traversing programs called robots or spiders, which follow link after link within webpages across the internet. The web-traversing programs catalog documents and store information for transmission to a parent database where the information is sifted, categorized, and stored. After a web-traversing program has run, the database compiled through the efforts of the robots and spiders is searched using a database management system. Using keywords or search terms provided by a user, the system's database locates matches.

Referring back to FIG. 4B, the screen displayed 215 requires two inputs from the user: the key phrase 220 and the database to be searched 230. The key phrase 220 can be a phone number, a facsimile number, an e-mail address or a web address. By pointing and clicking on the pull down menu option area 225, the screen display 226 as shown in FIG. 4C is shown. The screen includes four key phrase types; 1) e-mail address 227; 2) telephone number 228; 3) facsimile number 229; and 4) web address 231. Additional key phrase "types" may be defined by the user. For example, "name" may be used as a fifth key phrase. The phone number and facsimile number may be combined for search purposes.

In the case where a phone number or a facsimile number is entered, the default designated county and area code for the phone number or the facsimile number is the same country and area code as the individual's ISP unless the user enters the area code and/or country code. The user may alternatively specify other country and area codes by pointing and clicking on the pull down menu option areas 232, 233. As shown in FIG. 4D, a list of countries 234 will be displayed. The user can select the designated country from the list 234 by clicking on same, and the corresponding country code will be incorporated into the phone number or the facsimile number. The user can select a designated area code in the same manner from the list 234 by clicking on same, and the corresponding area code will be incorporated into the phone number and facsimile number.

Figure 4F:
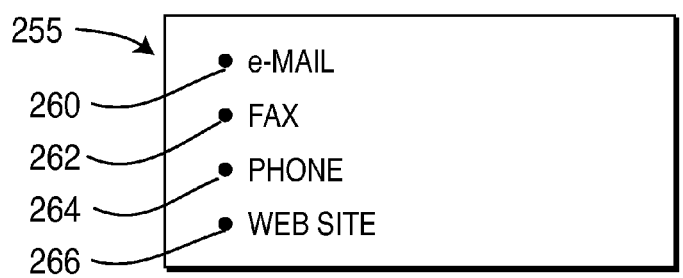
Figure 4G:
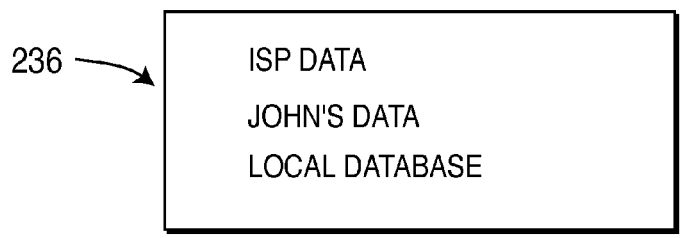

In another embodiment of this invention, as shown in FIG. 4F, the screen display 255 further provides the user the option to select from sending e-mail 260, sending a facsimile 262, connecting a phone call 264 or accessing a website 266. This information can be continually displayed as the user is surfing the internet. The information automatically changes in the table as the user retrieves new webpages. Optionally, once the relating information has been retrieved from the database and displayed on the screen 255, the user can select the desired one, then another display menu will pop up. Of course, a user can search and retrieve relevant information based on the content of the customized retrieve and display table. In this example, only e-mail, facsimile numbers, phone numbers, and website addresses are requested and displayed. The pop up menu offers four different selections: sending an e-mail by selecting the e-mail option 260, sending a facsimile by selecting the facsimile selection 262, connecting a phone call to the receiver, or connecting to the website. The retrieval function and the display can be customized to display local telephone numbers, fax numbers, e-mail numbers, etc.

Figure 5A:
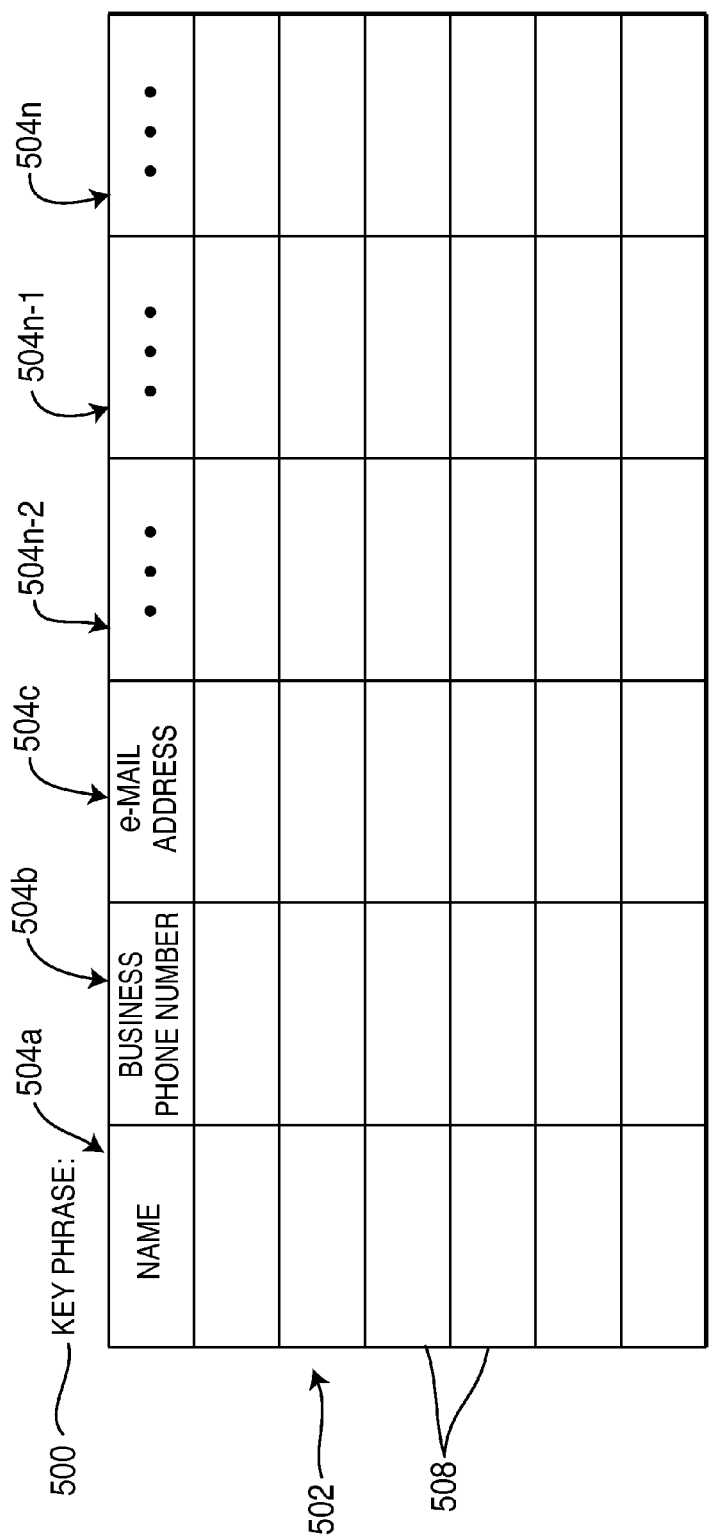

Referring to FIG. 5A, the system utilizes key phrases 500 and a retrieve and display table 502 in order to improve the manner in which a user accesses the internet. The criteria for the searching and the formatting of the information resulting therefrom can be entirely user-defined. The search criteria are based upon the key phrase 500. The results of the search populate the retrieve and display table 502 comprising columns 504 and rows 508. The columns $504_{a-n}$ may be defined by the user as shown in FIG. 5B.

Referring to FIG. 5B, the user accesses a screen which lists both the key phrase 500 and table headings 510. As the user selects the different table headings 510, (for example, business phone number, extension, name and title), the corresponding columns $504_{a-d}$ appear in the table 502. The user can select from the plurality of predefined table headings 510, or may create their own headings and customize the table 502 according to their needs. In this manner, the system permits users to use one or more key phrases to obtain results in a systematic and organized fashion according to their needs. This is significantly different than present search engines which provide results in descending order of matching with the key words. The system will be explained in greater detail with reference to the following example.

Figure 5C:
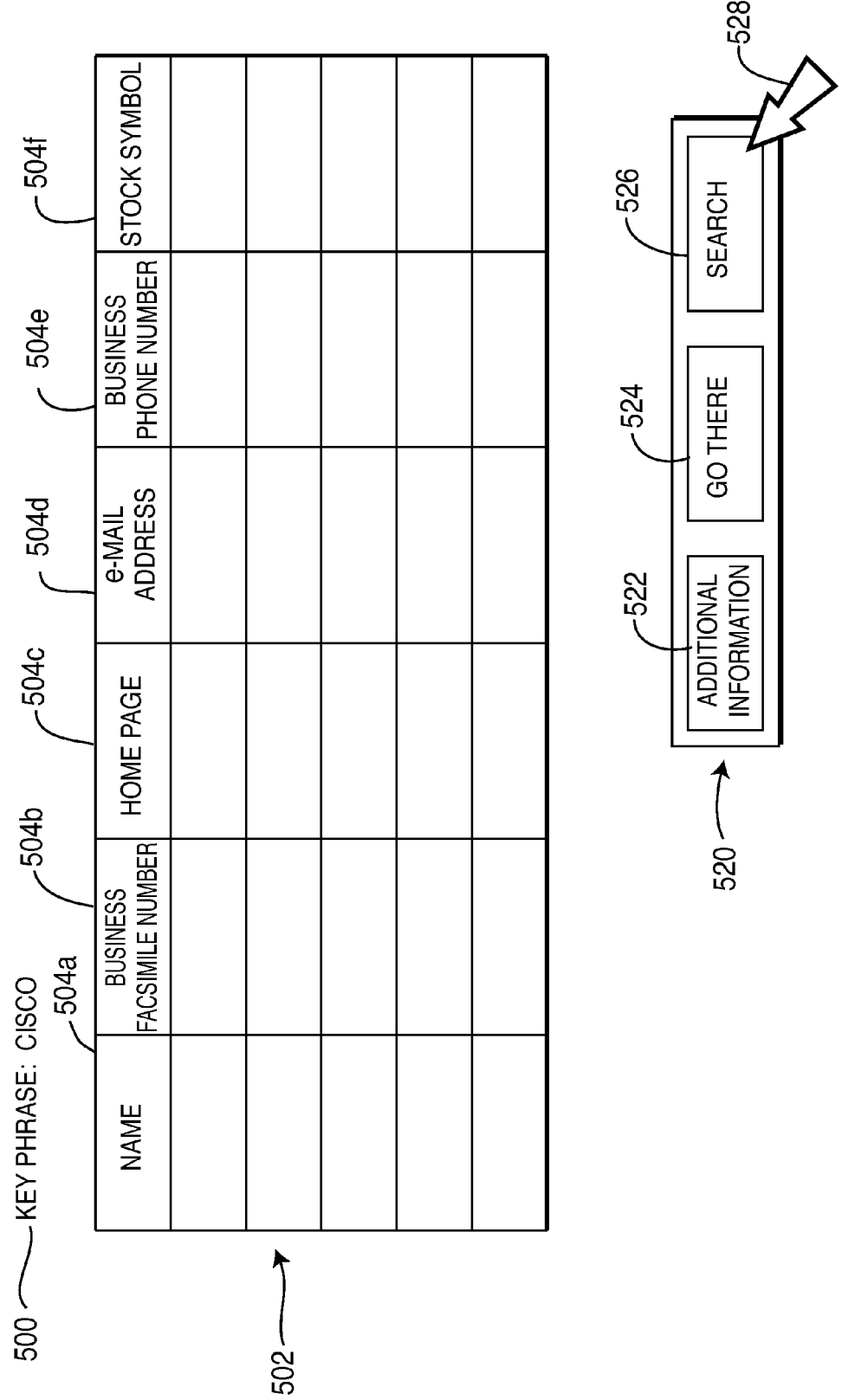
Figure 5D:
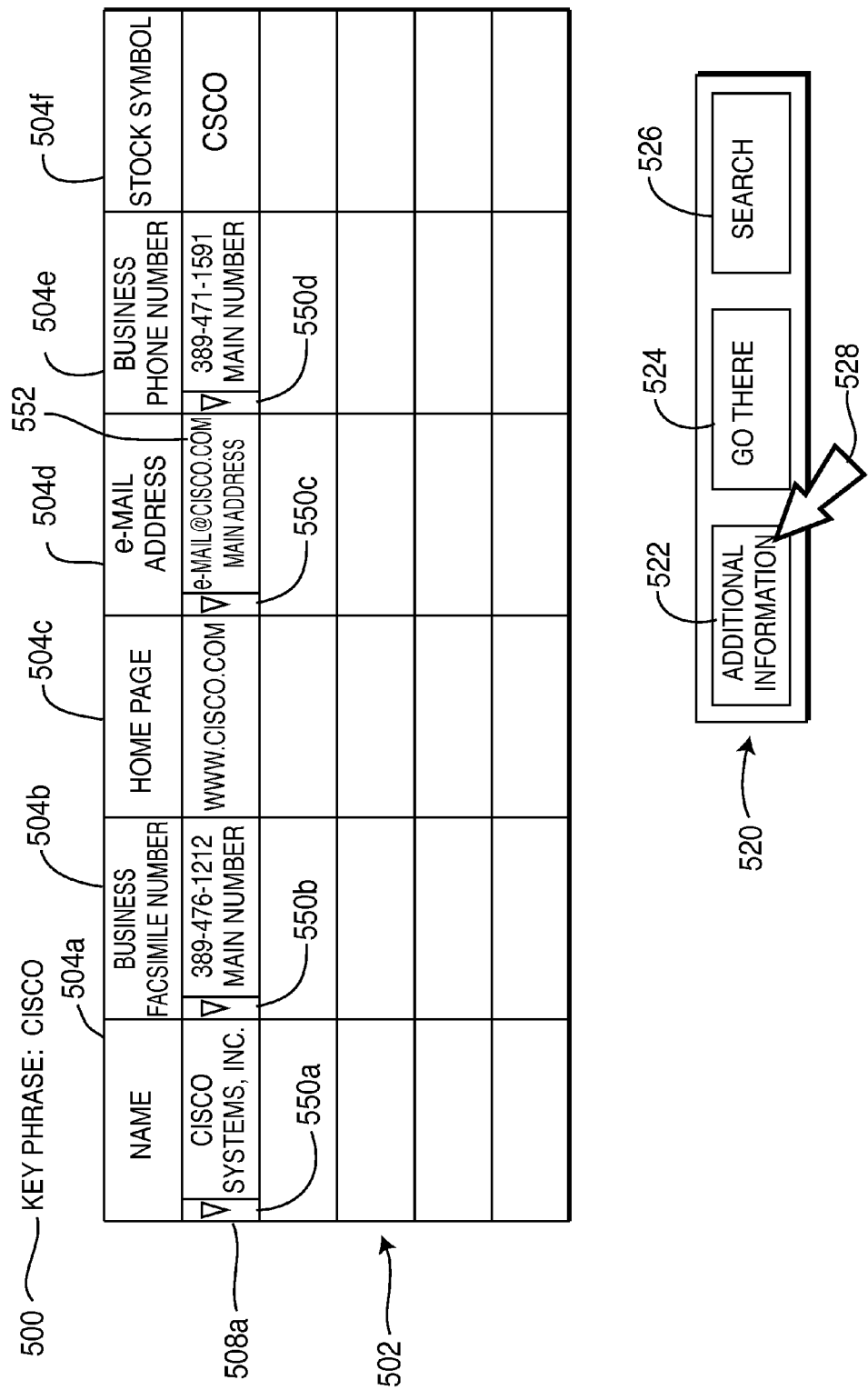
Figure 5E:
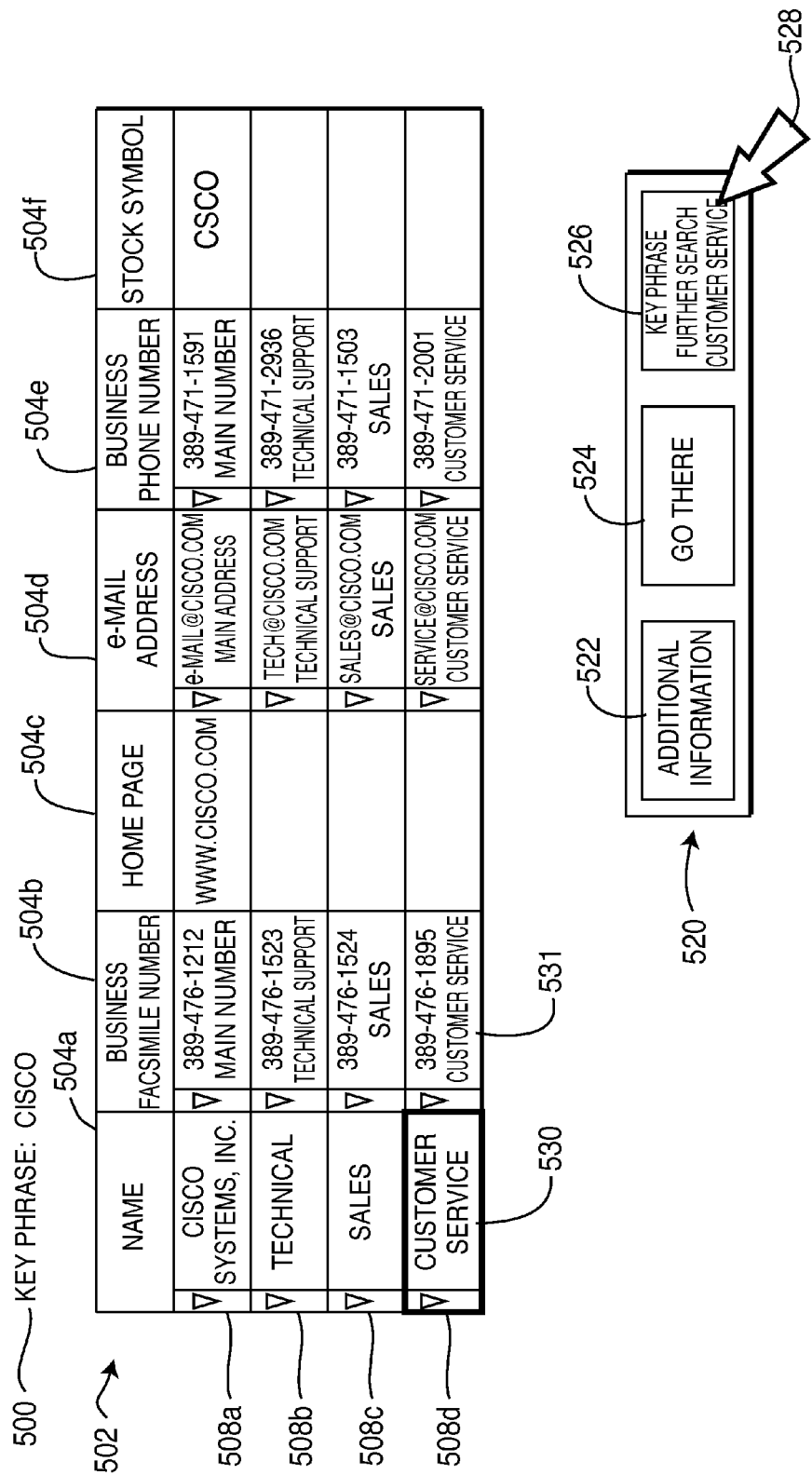

Referring to FIG. 5C, the key phrase 500 that has been selected is Cisco. The table 502 includes the table headings (selected from the list 510 shown in FIG. 5B) for name, business facsimile number, homepage, e-mail address, business phone number and stock symbol which provide the headings for the six columns $504_{a-f}$. After the user has input Cisco for the key phrase 500 and created the table 502, they can select among three options within the activity menu 520. As will be explained in further detail, the three options are ADDITIONAL INFORMATION 522, GO THERE (i.e., perform function) 524, and SEARCH 526. In order to initiate the search, the cursor 528 is moved to the SEARCH button 526 and selected. The search could also be automatic upon highlighting a specific cell and depressing the "return" button on the keyboard or double-clicking the mouse on the specific cell. Referring to FIG. 5D, the search results populate the cells in the first row $508_a$. As shown, a search is performed for the information that most closely matches the key phrase and also the particular columns $504_{a-f}$. In the embodiment that is shown, the system returns only the most relevant search results and places them in the cells in a single row $508_a$. Optionally, if additional information is available, such as multiple responses to the particular query, the ADDITIONAL INFORMATION button 522 is highlighted. If the user desires additional information regarding all columns $504_{a-f}$, the cursor 528 is moved to the ADDITIONAL INFORMATION button 522 and selected. This results in the table 502 shown in FIG. 5E. In this table 502, the cells in additional rows $508_{b-d}$ are populated if additional information for the particular column $504_{a-f}$ is available. As shown in FIG. 5E, additional information was available for this business facsimile number, e-mail address and business phone number column $504_b$, $504_d$, $504_e$. In this manner, a user can more easily obtain specific information regarding the departments or personnel that they wish to contact.

Referring back to FIG. 5D, the system indicates that additional information is available for selected fields by providing "down arrow" selection buttons $550_{a-d}$. In this manner, if a user wants additional information only regarding a specific column, the user selects the down arrow $550_{a-d}$ associated with that column. For example, if the user wants more information regarding the e-mail addresses $504_d$, they select the down arrow $550_c$. Only the additional information associated with that column $504_d$ will be presented. However, if the user selected down arrow $550_a$ for more information regarding Cisco Systems, this also results in the table 502 shown in FIG. 5E. Optionally, the user can select a particular cell, such as cell 552, and double-click on it to perform the particular function, which in this case is sending an e-mail.

The user may also perform a subsearch, which uses the results of the earlier searches to further refine the search. For example, referring again to FIG. 5E, once all of the information for a particular key phrase has been obtained, the user may wish to further refine the results of their search. If the user desires to get more information regarding the customer service department's facsimile number, they move the cursor to the customer service cell 531 in column $504_b$ in row $508_d$. If the user desires more information regarding the customer service department, they can select cell 530 which becomes highlighted as shown, the cursor 528 is moved to the SEARCH button 526. As shown, the SEARCH button 526 has changed to indicate that the system is undertaking a further search using a new selected key phrase. The KEY PHRASE FURTHER SEARCH button 526 now includes the further key phrase "customer service". Accordingly, the KEY PHRASE FURTHER SEARCH button 526 is selected which results in the table shown in FIG. 5F.

Figure 5F:
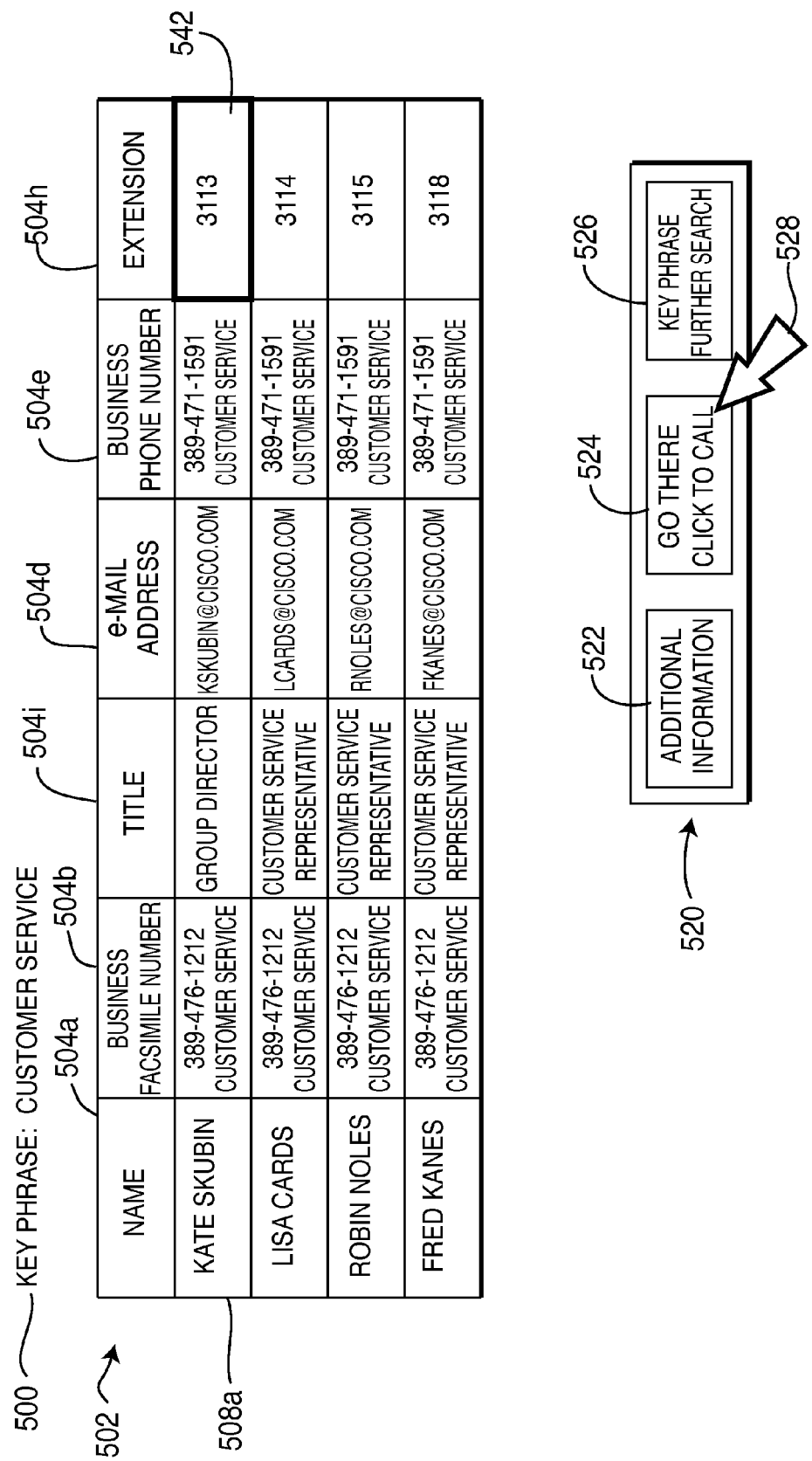

Since the key phrase is now customer service, the system populates the table 502 with the results of the key word search. As shown in FIG. 5F, the user can also modify the table 502 before or after they depress the KEY PHRASE FURTHER SEARCH button 526. In the example shown in FIGS. 5E and 5F, the user deleted column $504_f$ including stock symbol and added the column $504_h$ including the extension number, and deleted column $504_c$ for the homepage and added column $504_i$ with the title of the person. Accordingly, a table 502 as shown in FIG. 5F shows all of the information that user believes is relevant for their search on the personnel within the customer service department of Cisco.

As understood by those of skill in the art, the system may display a single row 508 at a time, (for example, row $508_a$ shown in FIG. 5E), and provide up and down arrows to scroll through all of the choices. Alternatively, only the cells that are populated are returned to the user. If the user would like to select a particular person to speak to, such as Kate Skubin, the group director of customer service, the user can move the cursor 528 to column $504_h$ which lists the extension numbers for all of the employees. The user can then select the cell in first row $508_a$ of that column which lists the extension number for Ms. Skubin. Once this cell 542 has been highlighted, the cursor is then moved down to the GO THERE button 524. The GO THERE button 524 will change as shown in FIG. 5F to include the words "click to call". It should be noted that the selection of a particular cell for an extension will dial that extension if the user is on the same company phone system. Otherwise, the user would select a column heading such as direct inward dial (DID) number. This permits customers and other people "outside" the company's phone system to contact the personnel directly. It should be noted that the GO THERE button 524 will change depending on the action to be taken. For example, when the GO THERE button 524 is selected, the system places a call directly with Ms. Skubin. In the same manner, Ms. Skubin may be e-mailed or faxed depending upon the cell which is selected.

Although the present invention is designed to search and retrieve information over the internet, one embodiment of the invention builds a local database for search and retrieval using the standard table headings 510 shown in FIG. 5B. As explained earlier, web crawlers, robots or spiders are used to populate the main level of the database. The main level will be referred to hereinafter as "level 1". This can be graphically represented by row $508_a$ in FIG. 5D. For example, a webcrawler searching the web and accessing webpages may be able to find a company's name, e-mail address, home page and phone number. The system may access other unrelated databases, such as an on-line financial database, to ascertain other information regarding the company, such as the company's stock symbol.

Alternatively, the data may be selectively input by companies that wish to participate and utilize the database services. For example, the data may be input manually by a company's employee, subcontractors and agents, and forwarded enmasse to a central website maintained for the purposes of creating a master database. The information in the database can then be available to all users to download to their local database. If a company participates in this manner, it may select from among the table headings 510 in FIG. 5B and can create new headings. If standard table headings 510 such as shown in FIG. 5B are not used, the headings created by a particular company must be correlated with the standard headings or new standard headings created to accommodate the entries by that company. Accordingly, the system provides the option of providing users with blank tables and selecting from among standardized headings, or permitting users to create their own headings.

For example, if a company wanted to have "president's office" on the first level with a phone number, fax number and e-mail address, they can customize the table headings prior to entering the information. The user can select "create customized heading" as shown in the table headings 510 of FIG. 5B. Alternatively, when a user is searching the information from a particular company, the table headings may note which fields, if any, were created by the actual company. Further, when searching, a user can query the system to provide all applicable table headings available for a particular keyword (i.e., person or company).

When the system provides a "blank table" for the user to utilize, the system provides a level 1 table with a standard heading, (i.e., a table with multiple columns and one row). The table may then be modified and further customized as desired. Down arrows may be used to add subsequent levels, i.e., additional rows. The system may only permit one row for level 1 and multiple rows of information for subsequent levels. These rows may correspond to a division, department or other organizational structure pertaining to the company.

Subsequent levels for a company will be for smaller and smaller business units until the names of individual personnel populate the rows. Along with the individual names, the user also creates each individual's title. Basically, the system may permit users to switch from column table headings to row table headings and vice versa. Column table headings 510 are shown in FIG. 5B. Row table headings $508_{a-d}$ are shown in FIG. 5E. Upon populating a database, the flexibility between the column table headings 510 and the row table headings $508_{a-d}$ permits users to enter information into the blank table by either the row or the column, whichever is more convenient for the user. If a user querying the system had the proper access, the user may have the system provide all column headings or row headings available for a particular keyword (i.e., company) to allow the user to quickly retrieve or process the information desired.

The centralized database, for example a database accessible via a website, can be maintained by a centralized database management staff or by users with proper passwords. Individual companies may create and maintain their own local database, but permit the database to be searched, via a link to the website. If the centralized database is linked in such a manner to an individual company's database, the system automatically searches the company's database when users query for information from this database. If a company maintains their own database linked to the centralized database, the centralized database management staff does not have the ability to change the actual data.

When a user wants to input information into the centralized database, they must be provided with access to the database. The system may be accessed directly by the user or by following a link to the website. For example, one website may have the URL ReachPeople.com. The name Reach People™ is a trademark of the applicant.

If the user is entering data into the centralized database for the first time, the user is prompted to provide specific information, such as filling in a blank table. In order to ensure the quality and traceability of the information, a method is provided to validate the information. In one embodiment, the user's ISP authenticates the user and confirms the user's e-mail address. In another embodiment, upon entering data, the user is prompted for a method of contact that the user prefers. The user is also prompted for a user name and password. For example, if the user desires to be contacted by e-mail, phone or facsimile, they enter such a preference. Once the user completes the entering of data, the system generates a transaction number and associates that transaction number with each cell of data that the user has entered. The system then sends the transaction number to the user via the particular method of contact chosen by the user. For example, if the user chose to be contacted by e-mail, the system e-mails the transaction number to the user. This completes the input procedure. However, information input into the system is unavailable to other users until the information is validated.

In order to validate the information, the user must log onto the system with their username and password and input the transaction number. All of the information associated with that transaction number will be "released" to all of the users using the centralized database. If the user does not validate the information by providing the transaction number after a predetermined period of time, which is set by the centralized database management staff, all of the data associated with the particular transaction number is purged from the system.

The present invention also provides a method for changing information in the centralized database. The user enters their username, password, and the transaction number. Should the user not provide the correct transaction number and password, the user cannot gain access to making changes. The user will be able to edit all data associated with the transaction number. The system will track and store all data and associated transaction numbers and the times, dates, and usernames that changed the data. This ensures direct accountability for all data changes. After the user edits the data, the user clicks on "update".

In an alternative embodiment, the system may permit information to be retrieved from, or sent from, anyone without placing any restriction on the user. In this embodiment, a user may become an information supplier and enter unreliable information into the system through the internet.

The system has the ability to run various reports and delete selected information at any time as measures to verify the accuracy of supplied information. The system can automatically review its data files for inconsistency. The system can automatically use available communication means to contact the information supplier about the inconsistency of the information and request the information supplier confirm the accuracy of the supplied information. For example, if an individual is contacted by an e-mail for the confirmation, the user can respond by e-mail. If the user receives a phone call for confirmation, the system may have an automatic voice system to explain the purpose of the phone call and ask for confirmation on questioned information regarding information in each field in the table. The information supplier can either respond by voice input or manual selection through the telephone button set to acknowledge, correct, incorrect or change. Optionally, before the system makes changes, the system can then block modification to how it received the new information as well as how it receive the original information. When the blocked information is further verified, the system will release such information for modification. The system also has the ability to self-correct the content of its database. For example, the system can update its existing phone numbers to a new phone number in its database if a call to the original phone is placed and the operator advises that there is a new phone number. If there is no forwarding phone number, the system may attempt to re-verify the information by attempting to contact the individual by using one or all of the communication means (i.e., e-mail, fax etc.). If the system makes contact, the system allows the incorrect information to be modified.

In an alternative embodiment, each user can build their own database about themselves and provide a link to the centralized database. The system will search the centralized database for desired information and also any local databases which are linked in such a manner. Those of skill in the art should realize that there are many current methods for linking databases across the internet, and the manner of linking the databases is not central to the present invention. A local database may remain only in the user's local computer system. Alternatively, the database may be maintained at the user's internet service provider but may only be accessible when the user is online. A user may set certain restrictions and block selected information, such as credit card information from further modifications. Generally, it can specify certain mandatory basic information that a user has to supply under certain circumstances. The basic information such as the user's name, address, telephone number, "ship to" address (if different then the user's address), credit card number, e-mail address, zip code for mailing purposes, personal profile such as likes, dislikes, age, nicknames, sports, etc.

For example, for online shopping, a user must provide credit card information upon placing an order. In essence, the system can use an established standard format to overlay the data file information into the various fields of a particular website, upon an icon being selected (for example, when a user purchases something). The website may display all information automatically filled in and/or may only prompt the fields that did not match the data file fields, consequently remaining "blank", allowing the user to fill in manually. The term "table" as used in the present invention represents array of key phrases, since each cell in a table may form the basis of a further search.

In an alternative embodiment, the retrieve and display table may continually appear or be requested by the user to appear when the user is "surfing the web". Once the user invokes the software, the content of the retrieve and display table will be automatically retrieved and updated accordingly. If the user wanted to e-mail, phone or facsimile, the user would simply click the corresponding icon to do so.

It should be noted that a "wildcard" can be used as part of searching phone numbers or facsimile numbers. For example, telephone number 215-756-32** can be used as keyword to search all the phone numbers or facsimile numbers between 215-756-3200 to 215-756-3299. Or if 215-756-3*45 is used for the keyword, then the system will retrieve the 10 phone numbers or facsimile numbers related to 3045, 3145, 3245, . . . , 3945.

Although the input devices such as keyboard and mouse are used in this specification for explanation purposes, other input methods or devices such as a voice input device or a touch screen device can also be used with the present invention.

The present invention can be used as the base for a future internet search engine or directory. A user, by providing phone numbers or facsimile numbers can quickly access all information on the internet and retrieve the information as he specified. Therefore, a user can surf the internet more efficiently.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. An interactive directory system for permitting a user to access and retrieve information from a network of computers, comprising:
    a key phrase field for accepting a search term;
    a data table that is selectively definable by a user comprising:
        at least two columns, each of said columns having a column heading, at least one of the column headings being selected by the user from a plurality of available column headings; and
        at least one row and a plurality of cells, said plurality of cells corresponding to said at least two columns, each of said plurality of cells for storing a unique identifier related to its corresponding column heading and row and said search term; and
    a search unit for searching for unique identifiers from the network of computers related to the search term, and one of said at least two column headings, said search unit storing said unique identifiers in the applicable cell;
whereby each said cell can be activated by the user to perform at least one action related to said stored unique identifiers.

2. The interactive directory system of claim 1, wherein said action is selected from the group comprising obtaining additional information, placing a telephone call, sending a facsimile, and sending a message over the network of computers.

3. The directory system of claim 1, wherein said network of computers includes the Internet.

4. The directory system of claim 1, wherein said at least one row has a row heading selected by the user from one of a plurality of available row headings.

5. The directory system of claim 2, wherein said message is an email.

6. The directory system of claim 1, wherein said stored unique identifiers originate from at least two sources.

7. The directory system of claim 1, wherein said at least one action is implemented with a single selection of the cell.

8. The directory system of claim 1, wherein said system is accessed by selecting an icon on a computer screen.

9. The directory system of claim 8, wherein said plurality of cells are automatically filled in as a user searches the Internet.

10. The directory system of claim 1, wherein said unique identifier is a phone number, and said action comprises placing a telephone call.

11. The directory system of claim 1 wherein said unique identifier is a facsimile number, and said action comprises sending a facsimile to said facsimile number.

12. The directory system of claim 1, wherein said unique identifier is an e-mail address, and said action comprises sending an e-mail to said e-mail address.

13. The directory system of claim 1, further comprising a cursor and an activity menu having a plurality of activity buttons; whereby each of said activity buttons defines an action related to said unique identifiers within a cell.

14. The directory system of claim 12, wherein said cursor is activateable to highlight one of said plurality of cells and at least one of said plurality of activity buttons change to reflect said stored unique identifier in said highlighted cell.

15. The directory system of claim 1, wherein rows and columns are interchangeable.

16. The directory system of claim 1, further comprising at least one database, whereby said system accesses and retrieves information within said at least one database.

17. A method for permitting a user to access and retrieve information from a network of computers, comprising:
 defining a key phrase field for accepting a search term;
 defining a data table that is selectively definable by a user comprising:
  at least two columns, each of said columns having a column heading, at least one of the column headings being selected by the user from a plurality of available column headings; and
  at least one row and a plurality of cells, said plurality of cells corresponding to said at least two columns, each of said plurality of cells for storing a unique identifier related to its corresponding column heading and row and said search term;
 searching for unique identifiers from the network of computers related to the search term, and one of said at least two column headings, said search unit storing said unique identifiers in the applicable cell; and
 activating at least one of said plurality of cells to perform at least one action related to said stored unique identifiers.

18. The method of claim 17, wherein said action is selected from the group comprising obtaining additional information, placing a telephone call, sending a facsimile, and sending a message over the network of computers.

19. The method of claim 17, wherein said network of computers includes the Internet.

20. The method of claim 17, further comprising selecting said at least one row heading from one of a plurality of available row headings.

21. The method of claim 18, wherein said message is an email.

22. The method of claim 17, wherein said stored unique identifiers originate from at least two sources.

23. The method of claim 17, further comprising implementing said at least one action with a single selection of the cell.

24. The method of claim 17, further comprising accessing said system by selecting an icon on a computer screen.

25. The method of claim 24, further comprising automatically filling in said plurality of cells as a user searches the Internet.

26. The method of claim 17, wherein said unique identifier is a phone number, and activating step comprises placing a telephone call.

27. The method of claim 17 wherein said unique identifier is a facsimile number, and said activating step comprises sending a facsimile to said facsimile number.

28. The method of claim 17, wherein said unique identifier is an e-mail address, and said activating step comprises sending an e-mail to said e-mail address.

29. The method of claim 17, wherein rows and columns are interchangeable.

30. A directory system for permitting a user to access and retrieve information from a network of computers, comprising:
 a key phrase field for accepting a search term;
 a data table comprising a plurality of cells arranged into at least one row and at least two columns, each of said plurality of cells for storing a unique identifier related to its corresponding column and row and said search term, each of said plurality of cells being user selectable to identify a subsearch criteria; and
 a search unit for conducting a search and a subsearch, the search unit conducts the search for unique identifiers related to the search term from the network of computers, the search unit further conducts a subsearch for unique identifiers from the network of computers related to the search term and the subsearch criteria, said search unit storing said each unique identifier in an applicable cell.

31. The system of claim 30, wherein the search unit conducts the subsearch in response to user selection of a cell.

32. The system of claim 30, wherein the search unit conducts the subsearch in response to user selection of an arrow.

33. The system of claim 30, wherein the search unit conducts the subsearch in response to user selection of an activation button.

34. The system of claim 30, wherein each said cell can be activated by the user to perform at least one action related to said stored unique identifiers.

35. The system of claim 34, wherein said action is selected from the group comprising obtaining additional information, placing a telephone call, sending a facsimile, and sending a message over the network of computers.

36. The system of claim 35, wherein said message is an e-mail.

37. The system of claim 34, wherein said at least one action is implemented with a single selection of the cell.

38. The system of claim 34, wherein said unique identifier is a phone number, and said action comprises placing a telephone call.

39. The system of claim 34 wherein said unique identifier is a facsimile number, and said action comprises sending a facsimile to said facsimile number.

40. The system of claim 30, wherein the search unit conducts subsearch based on a user access level.

41. The system of claim 30, wherein the search unit conducts the subsearch on a database maintained by a company associated with the subsearch criteria.

42. The system of claim 30, wherein the search unit conducts the subsearch by querying a restricted database.

43. The system of claim 30, wherein the search unit conducts the search by employing web crawling.

44. The system of claim 30, wherein said network of computers includes the Internet.

45. The system of claim 30, wherein said stored unique identifiers originate from at least two sources.

46. The system of claim 30, wherein said system is accessed by selecting an icon on a computer screen.

47. The system of claim 30, further comprising a cursor and an activity menu having a plurality of activity buttons; whereby each of said activity button defines an action related to said unique identifiers within a cell.

48. The system of claim 47, wherein said cursor may be activated to highlight one of said plurality of cells and at least one of said plurality of activity buttons change to reflect said stored unique identifier in said highlighted cell.

\* \* \* \* \*

UNITED STATES PATENT AND TRADEMARK OFFICE
CERTIFICATE OF CORRECTION

Page 1 of 1

PATENT NO. : 7,272,637 B1
APPLICATION NO. : 09/585151
DATED : September 18, 2007
INVENTOR(S) : Richard B. Himmelstein It is certified that error appears in the above-identified patent and that said Letters Patent is hereby corrected as shown below:

Title page, add the priority data as follows:

--Related U.S. Application Data

(60) Provisional application No. 60/143,982, filed on Jul. 15, 1999, provisional application No. 60/174,561, filed on Jan. 5, 2000.--

Column 1, line 5, insert --The present application claims priority to U.S. Provisional Patent Application No. 60/143,982, filed Jul. 15, 1999, as well as U.S. Provisional Patent Application No. 60/174,561, filed Jan. 5, 2000.--

Signed and Sealed this
Third Day of July, 2012

David J. Kappos
*Director of the United States Patent and Trademark Office*